(12) United States Patent
Liu et al.

(10) Patent No.: US 8,425,111 B2
(45) Date of Patent: Apr. 23, 2013

(54) BRIDGE INTELLIGENT CABLE SYSTEM WITH BUILT-IN FIBER GRATING SENSOR

(75) Inventors: Lihua Liu, Jiangyin (CN); Xia Zhao, Jiangyin (CN); Desheng Jiang, Wuhan (CN); Huajuan Xue, Jiangyin (CN); Zhubing Zhou, Jiangyin (CN); Mingbao Zhou, Jiangyin (CN); Enlong Zhang, Jiangyin (CN); Shengchun Liu, Wuhan (CN); Sheng Li, Wuhan (CN)

(73) Assignee: Fasten Group Company, Ltd., Jiangyin (CN)

( * ) Notice: Subject to any disclaimer, the term of this patent is extended or adjusted under 35 U.S.C. 154(b) by 37 days.

(21) Appl. No.: 13/133,560

(22) PCT Filed: Nov. 27, 2009

(86) PCT No.: PCT/CN2009/001340
§ 371 (c)(1),
(2), (4) Date: Jun. 8, 2011

(87) PCT Pub. No.: WO2011/038536
PCT Pub. Date: Apr. 7, 2011

(65) Prior Publication Data
US 2011/0243185 A1    Oct. 6, 2011

(30) Foreign Application Priority Data
Sep. 30, 2009 (CN) .......................... 2009 1 0145152

(51) Int. Cl.
*G01K 1/14* (2006.01)
*G01J 5/08* (2006.01)
*G01N 3/02* (2006.01)

(52) U.S. Cl.
USPC ............... 374/130; 385/12; 385/13; 385/37; 385/53; 385/134; 356/32; 356/34; 374/143; 374/208; 374/46

(58) Field of Classification Search ........................ None
See application file for complete search history.

(56) References Cited

U.S. PATENT DOCUMENTS 5,493,113 A * 2/1996 Dunphy et al. .......... 250/227.19
5,945,666 A * 8/1999 Kersey et al. ............ 250/227.14
(Continued)

FOREIGN PATENT DOCUMENTS

CN    1779067 A    5/2006
CN  101539403 A    9/2009

OTHER PUBLICATIONS

Morey, W. W. (1996) "Recent Advances in Fiber Grating Sensors for Utility Industry Applications", Proc. SPIE 2595: p. 90-98.*

*Primary Examiner* — Lisa Caputo
*Assistant Examiner* — Janice M Soto
(74) *Attorney, Agent, or Firm* — The Webb Law Firm

(57) ABSTRACT

A bridge intelligent cable system with a built-in fiber grating sensor is provided, which is applied in a cable bearing structure such as a cable-stayed bridge, a suspension bridge, and an arch bridge. The system includes an anchor cup, a wire dividing plate, a connecting cylinder, a fiber grating sensor, and a cable body, in which the fiber grating sensor includes a fiber grating strain sensor and a fiber grating temperature sensor, tail fibers of the fiber grating strain sensor and the fiber grating temperature sensor are led out, the packaged fiber grating strain sensor is fixedly connected to an outer-layer steel wire of the connecting cylinder, the packaged fiber grating temperature sensor is suspended on the steel wire of the connecting cylinder, holes are punched in the wire dividing plate, and a preserved steel pipe is buried in advance in the connecting cylinder and the anchor cup.

1 Claim, 5 Drawing Sheets

U.S. PATENT DOCUMENTS

| | | | |
|---|---|---|---|
| 6,816,638 B1 * | 11/2004 | Bennion et al. | 385/13 |
| 7,038,190 B2 * | 5/2006 | Udd et al. | 250/227.11 |
| 2003/0002805 A1 * | 1/2003 | Trezza et al. | 385/59 |
| 2006/0285813 A1 * | 12/2006 | Ferguson | 385/138 |

\* cited by examiner

BRIDGE INTELLIGENT CABLE SYSTEM WITH BUILT-IN FIBER GRATING SENSOR

BACKGROUND OF THE INVENTION

1. Field of Invention

The present invention relates to an intelligent cable system with a built-in sensor, applicable to a cable bearing structure such as a cable-stayed bridge, a suspension bridge, and an arch bridge.

2. Related Art

A cable system of a modern long span bridge is a core component of a cable-stayed bridge and a suspension bridge, and self weight of the long span bridge and a dynamic load on the bridge are mostly delivered to a pylon column through the cable system, and therefore, an operation state of the cable is one of important signs directly reflecting whether the bridge is in a safe state. However, due to construction design, environmental corrosion, or fatigue accumulation, damage and deterioration of different degrees unavoidably occur to the cable in service. If a sensor is organically integrated into the cable, so that the cable can measure parameters such as an internal stress and temperature, and the cable is upgraded from a cable with pure bearing to an intelligent cable having an automatic sensing capability, and meanwhile, the possibility of monitoring the overall stress and partial wire stress of the cable is realized, it further facilitates people to master the structural safety and operation state of the cable and the whole bridge, and find an accident omen in time, thus preventing a sudden accident from happening. A fiber grating is a sensitive element with excellent performance, and senses external slight strain change through movement of Bragg reflection wavelength, so as to realize on-line monitoring of the parameters such as the structural stress and the temperature. The fiber grating has the characteristics of harsh environment endurance, immunity to interference of environmental noise, anti-electromagnetic interference, integration of sensing and transmission, simple structure, convenient use, and high measurement precision. However, the fiber grating without special treatment is very frail, and is easily broken if it is directly laid in the cable. The combination of the fiber grating and the cable involves the problems such as how and in which form the fiber grating is packaged, so as to improve survival rates of the fiber grating sensor and the fibers in cable manufacturing and application processes; how to build the packaged fiber grating sensor in the cable, so as to ensure reliability of the embedding technology of the fiber grating sensor; and how to effectively lead a fiber grating signal out of a cable body without distortion.

SUMMARY OF THE INVENTION

In order to overcome the foregoing deficiencies, the present invention is directed to a bridge intelligent cable system with a built-in fiber grating sensor, which can improve survival rates of the fiber grating sensor and the fibers in able manufacturing and application processes, ensure reliability of the embedding technology of the fiber grating sensor, and effectively lead a fiber grating signal out of a cable body without distortion.

The objective of the present invention is realized as follows. A bridge intelligent cable system with a built-in fiber grating sensor is provided, which includes an anchor cup, a wire dividing plate, a connecting cylinder, a fiber grating sensor built in the connecting cylinder, and a cable body, in which the fiber grating sensor includes a fiber grating strain sensor and a fiber grating temperature sensor, the fiber grating strain sensor and the fiber grating temperature sensor are first packaged, tail fibers of the fiber grating strain sensor and the fiber grating temperature sensor are led out, the packaged fiber grating strain sensor is fixedly connected to an outer-layer steel wire of the connecting cylinder, the packaged fiber grating temperature sensor is suspended on the steel wire of the connecting cylinder, holes are punched in the wire dividing plate, a preserved steel pipe is buried in advance in the connecting cylinder and the anchor cup, and is led out through the holes in the wire dividing plate, the tail fibers of the fiber grating strain sensor and the fiber grating temperature sensor are connected to a fiber cable, the fiber cable is led out from a cable through the preserved steel pipe, and the fiber cable led out from the cable is connected to a fiber grating demodulator. The temperature in the cable, the overall stress condition of the cable, and the stress distribution condition of the steel wire in the cable can be monitored in real time by monitoring change of a central wavelength of the fiber grating.

A package structure of the fiber grating strain sensor is as follows. The fiber grating strain sensor includes a first fiber grating, central axial second steel pipes, first steel pipes, a first protection steel pipe with a slightly large diameter, and supports for connection to a cable steel wire, in which one first protection steel pipe, two second steel pipes, two supports, and two first steel pipes exist. The two second steel pipes, the two supports, and the two first steel pipes are arranged on two sides of the first protection steel pipe in bilateral symmetry, in which the diameter of the second steel pipe<the diameter of the first steel pipe<the diameter of the first protection steel pipe. A groove is opened axially in the middle of the second steel pipe, a hole is punched in an upper area of the support, and the first steel pipe with a certain gauge length passes through the hole in the upper area of the support and is connected to the support. Two ends of the first protection steel pipe with the slightly large diameter and proper length are respectively sleeved on one ends of the two first steel pipes, the other end of the first steel pipe is sleeved on one end of the second steel pipe, the first fiber grating passes through the second steel pipe, the first steel pipe, and the first protection steel pipe, a grating region is located at a central position of the first protection steel pipe, two ends of the first fiber grating are fixed in the grooves of the two second steel pipes by adhesive, a second heat shrinkable sleeve is sleeved outside a grooved place of the second steel pipe to protect the grooved portion, the tail fibers at the two ends of the first fiber grating are led out from other end of the second steel pipe, the support of the fiber grating strain sensor is connected to the steel wire of the cable, a protection hood is covered on the fiber grating strain sensor for protection, a sealing place of the protection hood and the steel wire is sealed by mastic, and an adhesive tape is then used to seal a gap of the steel wire after being sealed by mastic, and thus the totally packaged fiber grating strain sensor is formed.

The package structure of the fiber grating temperature sensor is as follows. The fiber grating temperature sensor includes a second fiber grating, a second protection steel pipe, and a second heat shrinkable sleeve. The second fiber grating is suspended in the second protection steel pipe, the tail fibers are led out from the second protection steel pipe, fixed by adhesive at the place where they are led out, and protected by the second heat shrinkable sleeve.

The beneficial effects of the present invention are as follows.

Through the intelligent cable system with the fiber grating sensor build in the connecting cylinder of the cable, the change of the central wavelength of the fiber grating is measured through the external fiber grating demodulator, and the stress distribution condition in the cable and the overall stress condition of the cable may be monitored in real time, thus meeting health monitoring requirements of extra-large bridges and improving bridge safety.

The reference numbers in the accompanying drawings are listed as follows:

1. anchor cup, 2. epoxy cast anchor filler, 3. steel wire, 4. connecting cylinder, 5. wire dividing plate, 5-1. hole, 6. connecting cylinder sealing filler, 7. preserved steel pipe, 8. fiber cable, 9. fiber grating strain sensor, 10. fiber grating temperature sensor, 11. cable body, 12. fiber grating demodulator;

9-1. first fiber grating, 9-2. second steel pipe, 9-3. first steel pipe, 9-4. support, 9-5. second heat shrinkable sleeve, 9-6. first protection steel pipe;

10-1. second fiber grating, 10-2. second protection steel pipe, 10-3. second heat shrinkable sleeve.

DETAILED DESCRIPTION OF THE INVENTION

The measurement of a stress state of a cable with a built-in sensor is always a research difficulty. A package structure of a built-in fiber grating strain sensor 9 of a cable is as follows.

Figure 1:
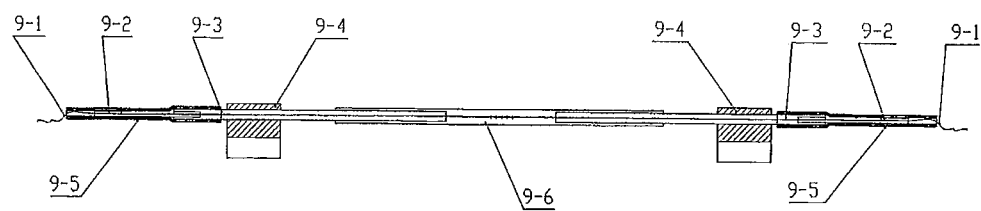
FIG. 1 is a schematic structural view of a fiber grating strain sensor according to the present invention.
Figure 2:
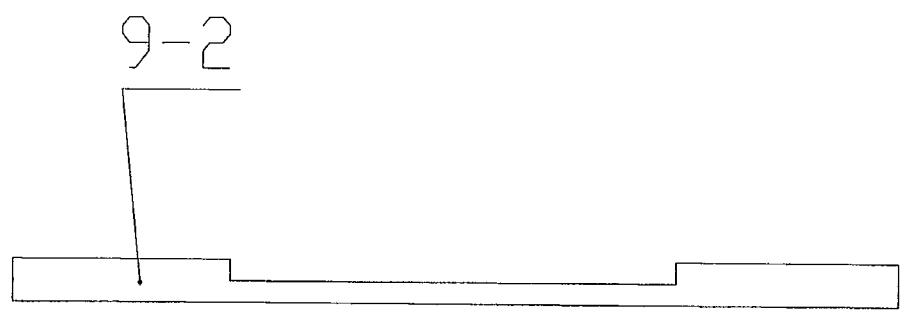
FIG. 2 is a schematic view of a second steel pipe according to the present invention.
Figure 3:
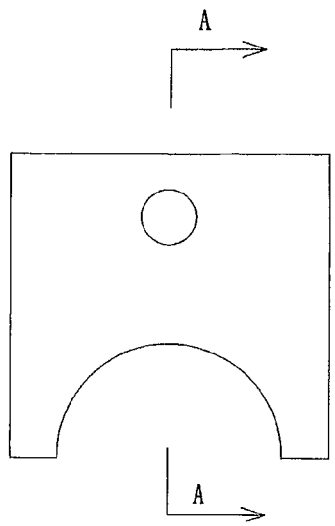
FIG. 3 is a view illustrating parts of a support according to the present invention.
Figure 4:
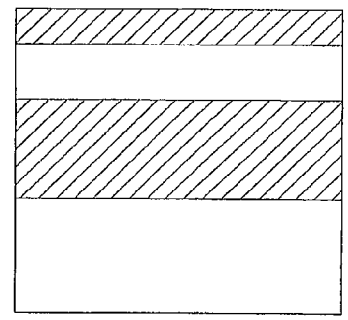
FIG. 4 is an A-A sectional view of FIG. 3.

Referring to FIG. 1, it is a schematic structural view of a fiber grating strain sensor according to the present invention. It can be seen from FIG. 1 that, the fiber grating strain sensor 9 according to the present invention includes a first fiber grating 9-1, second steel pipes 9-2, first steel pipes 9-3, a first protection steel pipe 9-6 with a slightly large diameter, and supports 9-4 for connection to a cable steel wire, in which one first protection steel pipe 9-6, two first steel pipes 9-3, two supports 9-4, and two second steel pipes 9-2 exist. The two first steel pipes 9-3, the two supports 9-4, and the two second steel pipes 9-2 are arranged on two sides of the first protection steel pipe 9-6 in bilateral symmetry, in which the diameter of the second steel pipe 9-2<the diameter of the first steel pipe 9-3<the diameter of the first protection steel pipe 9-6. A groove is opened axially in the middle of the second steel pipe 9-2, as shown in FIG. 2. A hole is punched in an upper area of the support 9-4, as shown in FIGS. 3 and 4. The first steel pipe 9-3 with a certain gauge length passes through the hole in the upper area of the support 9-4 and is connected to the support 9-4, and the first steel pipe 9-3 is cut into two pieces radially in the middle, with the purpose of directly delivering a force to a fiber grating, that is, directly pulling the fiber grating, thus preventing the first steel pipe 9-3 from being directly subjected to large strain. Two ends of the first protection steel pipe 9-6 with the slightly large diameter and proper length are respectively sleeved on one ends of the two first steel pipes 9-3 to protect a connection position after the thin steel pipe 9-3 is cut, the other end of the first steel pipe 9-3 is sleeved on one end of the second steel pipe 9-2, the first fiber grating 9-1 passes through the first steel pipe 9-3, the second steel pipe 9-2, and the first protection steel pipe 9-6, a grating region is located at a central position of the first protection steel pipe 9-6, two ends of the first fiber grating 9-1 are fixed in the grooves of the two second steel pipes 9-2 by adhesive, a second heat shrinkable sleeve 9-5 is sleeved outside the second steel pipe 9-2 to protect the grooved portion, and tail fibers at the two ends of the first fiber grating 9-1 are led out from the other end of the second steel pipe 9-2.

Figure 6:
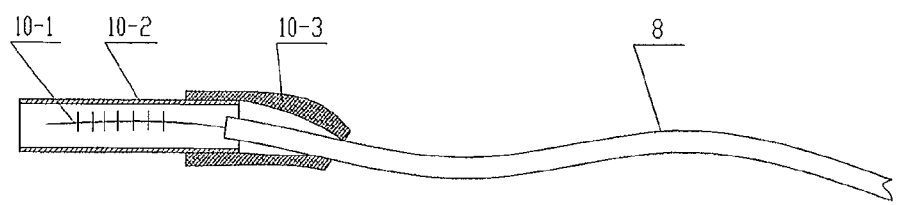
FIG. 6 is a schematic structural view of a fiber grating temperature sensor according to the present invention.

The package structure of the fiber grating temperature sensor is as follows. As shown in FIG. 6, the fiber grating temperature sensor 10 includes a second fiber grating 10-1, a second protection steel pipe 10-2, and a second heat shrinkable sleeve 10-3. The second fiber grating 10-1 is suspended in the second protection steel pipe 10-2, tail fibers are led out from the second protection steel pipe 10-2, fixed by adhesive at the place where they are led out, and protected by the second heat shrinkable sleeve 10-3.

Figure 5:
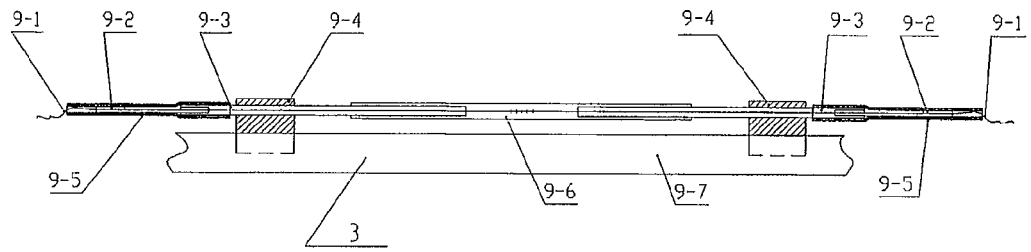
FIG. 5 is a schematic view illustrating connection of a fiber grating strain sensor and a steel wire of a cable according to the present invention.
Figure 7:
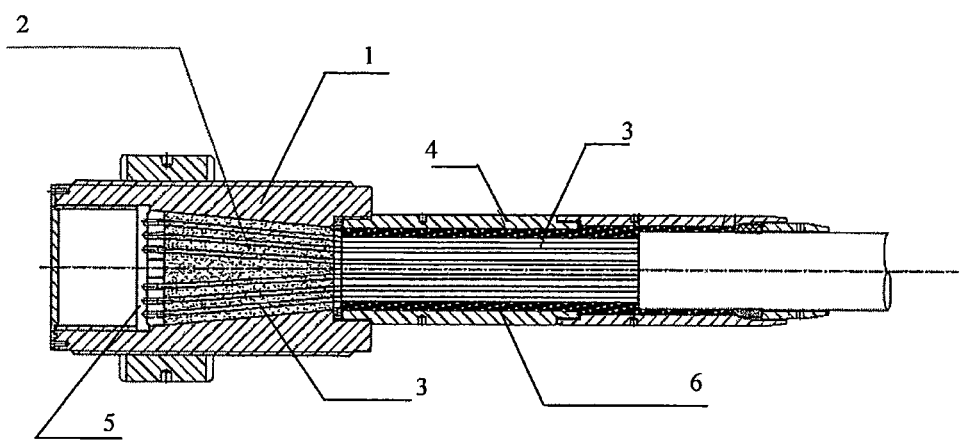
FIG. 7 is a schematic structural view of a common cable.
Figure 8:
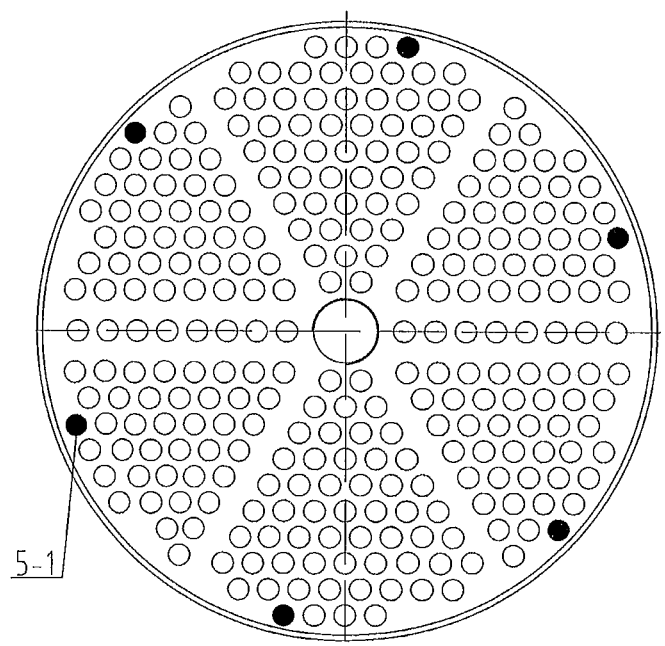
FIG. 8 is a schematic sectional view of a wire dividing plate of a cable according to the present invention.
Figure 9:
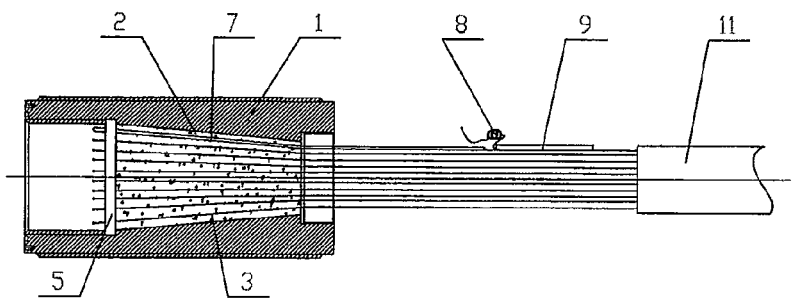
FIG. 9 is a schematic view of a preserved steel pipe in the cable according to the present invention.
Figure 10:
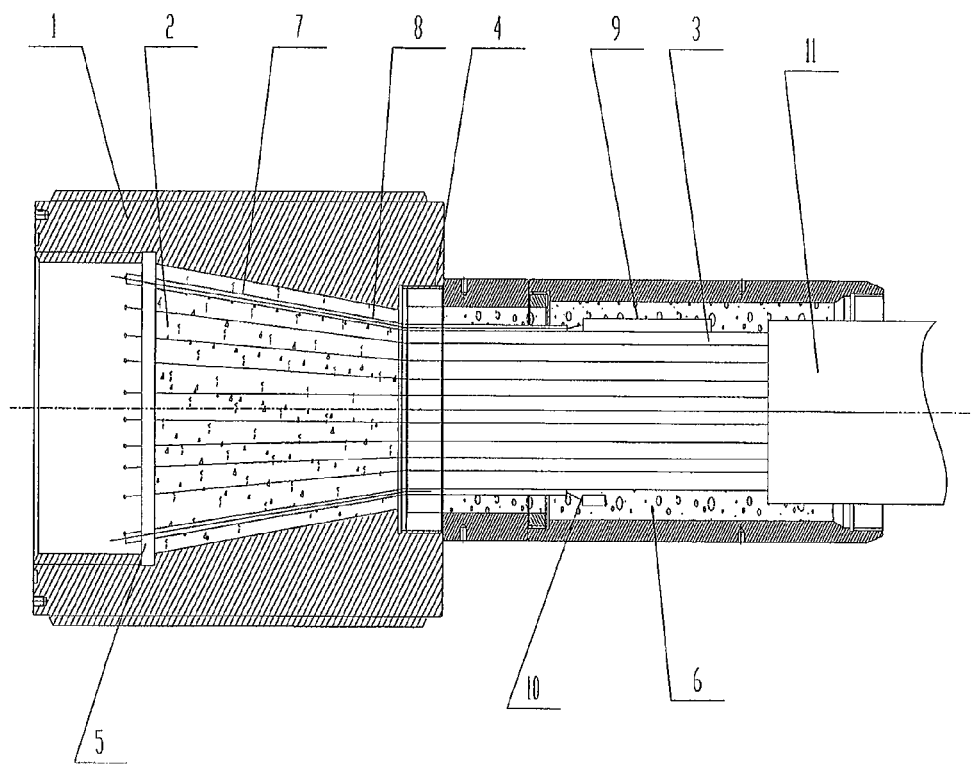
FIG. 10 is a schematic structural view of a bridge intelligent cable system with a built-in fiber grating sensor according to the present invention.

The arrangement of the fiber grating strain sensor 9 and the fiber grating temperature sensor 10 inside the cable involves the problem of how to effectively lead sensing signals of the fiber grating strain sensor 9 and the fiber grating temperature sensor 10 out of a cable body. A schematic structural view of a common cable is as shown in FIG. 7, in which the cable is formed by an anchor cup 1, an epoxy cast anchor filler 2, a steel wire 3, a connecting cylinder 4, a wire dividing plate 5, a connecting cylinder sealing filler 6, and a cable body 11. A plurality of holes 5-1 is preserved in the wire dividing plate 5 of the cable, as shown in FIG. 8. A preserved steel pipe 7 with the proper length and the proper diameter passes through the preserved hole 5-1, so as to produce a preserved channel for a fiber cable 8. The preserved steel pipe 7 is required to sustain a certain folding degree and a lateral pressure existing during pouring of the epoxy cast anchor filler 2. The epoxy cast anchor filler 2 is poured into the anchor cup 1, and the anchor cup 1 is put into a heating furnace for heating and solidification, so that the anchor cup and the internal steel wire are integrated. After the anchor-pouring process is over, the fiber grating strain sensor 9 is connected to the outer-layer steel wire 3 of the connecting cylinder 4 of the cable through the support 9-4, as shown in FIGS. 5 and 9, so that the force on the steel wire 3 is effectively delivered to the fiber grating of the fiber grating strain sensor 9. The fiber grating strain sensor 9 is protected by a protection hood, a gap between the protection hood and the steel wire is sealed by mastic, and an adhesive tape is then used to seal the outside to protect the fiber grating strain sensor, and thus a totally packaged fiber grating strain sensor 9 is formed, as shown in FIG. 9. The packaged fiber grating temperature sensor 10 is suspended on the steel wire in the connecting cylinder 4, and the fiber cable 8 is fitted into the preserved steel pipe 7. The connecting cylinder 4 is sleeved on, the connecting cylinder sealing filler 6 is poured in, and normal temperature solidification of the connecting cylinder is performed. A final schematic structural view of an intelligent cable is as shown in FIG. 10.

Figure 11:
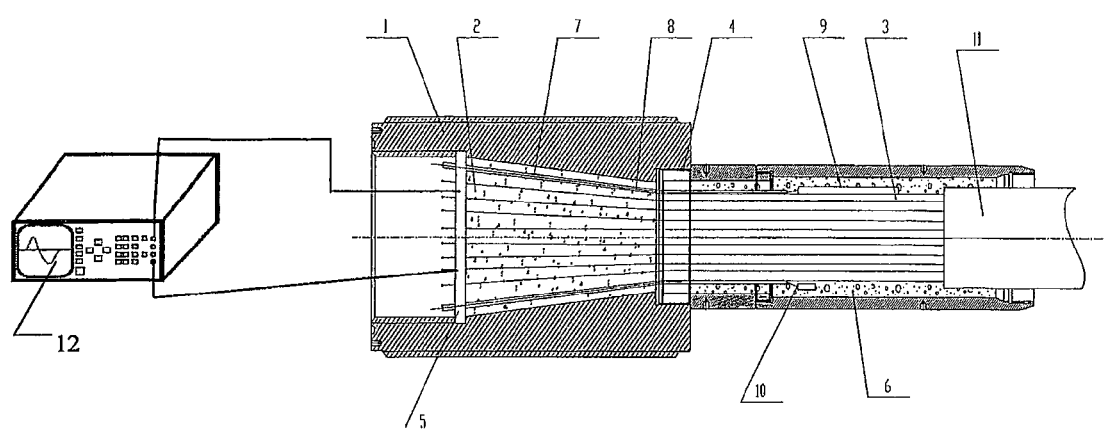
FIG. 11 is a schematic view illustrating monitoring of the bridge intelligent cable system with the built-in fiber grating sensor according to the present invention.

The fiber cable 8 led out from an anchor end of the intelligent cable is connected to a fiber grating demodulator 12, as shown in FIG. 11. Temperature change in the cable is monitored in real time through the built-in fiber grating temperature sensor by monitoring the change of a central wavelength of the fiber grating, and a stress distribution condition of the steel wire in the cable and the overall stress condition of the cable are monitored in real time through the built-in fiber grating strain sensor in combination with a compensation result of the temperature of the fiber grating.

What is claimed is:

1. A bridge intelligent cable system with a built-in fiber grating sensor, comprising: an anchor cup (1), a wire dividing plate (5), a connecting cylinder (4), a fiber grating sensor built in the connecting cylinder (4), and a cable body (11);

wherein the fiber grating sensor comprises: a fiber grating strain sensor (9) and a fiber grating temperature sensor (10), wherein the fiber grating strain sensor (9) and the fiber grating temperature sensor (10) are first packaged, tail fibers of the fiber grating strain sensor (9) and the fiber grating temperature sensor (10) extend through the connecting cylinder (4), the packaged fiber grating strain sensor (9) is fixedly connected to an outer-layer steel wire (3) of the connecting cylinder (4), the packaged fiber grating temperature sensor (10) is suspended on the steel wire (3) of the connecting cylinder (4), holes (5-1) are punched in the wire dividing plate (5), a preserved steel pipe (7) is buried in advance in the connecting cylinder (4) and the anchor cup (1), the preserved steel pipe (7) extends through the holes (5-1) in the wire dividing plate (5), the tail fibers of the fiber grating strain sensor (9) and the fiber grating temperature sensor (10) are connected to a fiber cable (8), wherein the fiber cable (8) extends through a cable which extends through the preserved steel pipe (7), and the fiber cable (8) extending through the cable is connected to a fiber grating demodulator (12);

wherein a package structure of the fiber grating sensor comprises: the fiber grating strain sensor (9) comprising a first fiber grating (9-1), first steel pipes (9-3), second steel pipes (9-2), a first protection steel pipe (9-6), and supports (9-4); one first protection steel pipe (9-6); two first steel pipes (9-3); two supports (9-4); and, two second steel pipes (9-2), wherein the two first steel pipes (9-3), the two supports (9-4), and the two second steel pipes (9-2) are arranged on two sides of the first protection steel pipe (9-6) in bilateral symmetry, a diameter of the second steel pipe (9-2) is less than a diameter of the first steel pipe (9-3), which is less than a diameter of the first protection steel pipe (9-6); a groove is opened axially in the middle of the second steel pipe (9-2); a hole is punched in an upper area of the support (9-4), wherein the first steel pipe (9-3) passes through the hole in the upper area of the support (9-4) and is connected to the support (9-4); two ends of the first protection steel pipe (9-6) are respectively sleeved on one end of the two first steel pipes (9-3); the other end of the first steel pipe (9-3) is sleeved on one end of the second steel pipe (9-2); the first fiber grating (9-1) passes through the second steel pipe (9-2), the first steel pipe (9-3), and the first protection steel pipe (9-6); a grating region is located at a central position of the first protection steel pipe (9-6); two ends of the first fiber grating (9-1) are fixed in the grooves of the two second steel pipes (9-2) by adhesive; a first heat shrinkable sleeve (9-5) is sleeved outside a grooved place of the second steel pipe (9-2); tail fibers at the two ends of the first fiber grating (9-1) are let out from the other end of the second steel pipe (9-2); the support of the fiber grating strain sensor (9) is connected to the steel wire of the cable, a protection hood is covered on the fiber grating strain sensor (9) for protection; a sealing place of the protection hood and the steel wire is sealed by mastic; and an adhesive tape is then used to seal a gap of the steel wire after being sealed by mastic, thereby forming the totally packaged fiber grating strain sensor; and, wherein a package structure of the fiber grating temperature sensor (10) comprises: the fiber grating temperature sensor (10) comprising a second fiber grating (10-1), a second protection steel pipe (10-2), and a second heat shrinkable sleeve (10-3), wherein the second fiber grating (10-1) is suspended in the second protection steel pipe (10-2); the second fiber grating (10-1) is connected to tail fibers from the second protection steel pipe (10-2); the tail fibers are fixed by adhesive at a place where they extend from the second protection steel pipe (10-2), and the second heat shrinkable sleeve (10-3) is sleeved on.

* * * * *